Patented July 20, 1937

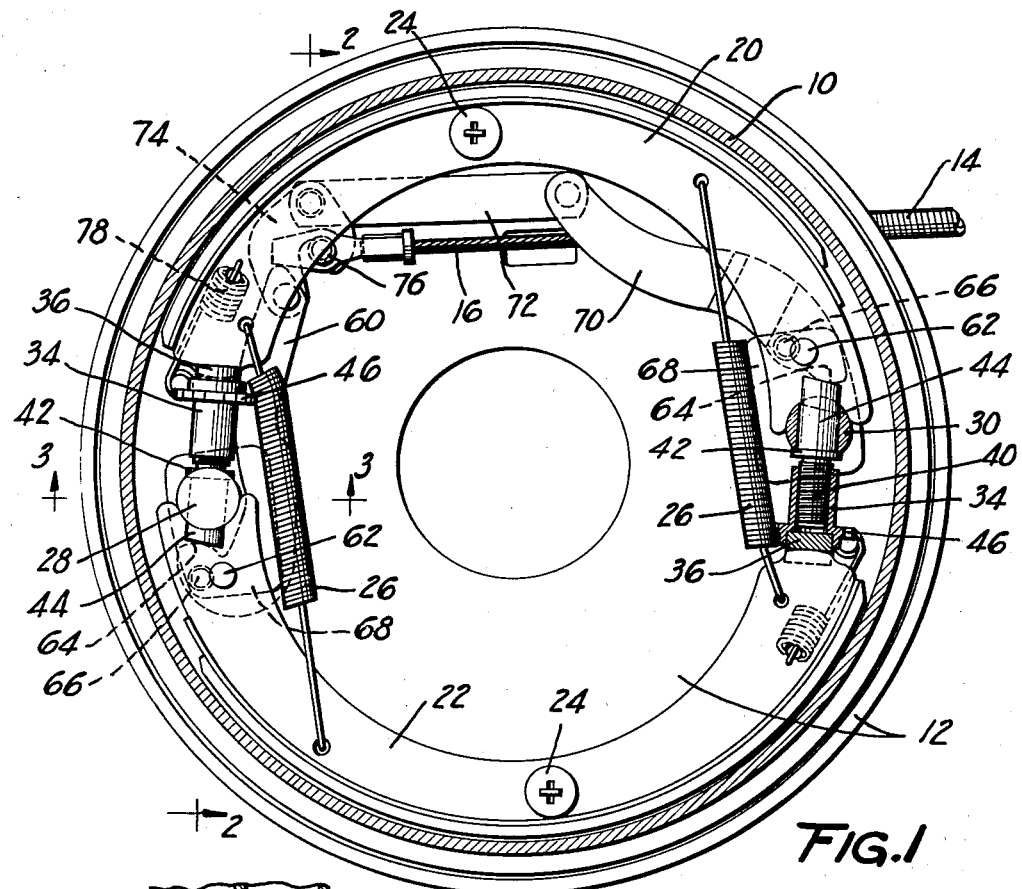
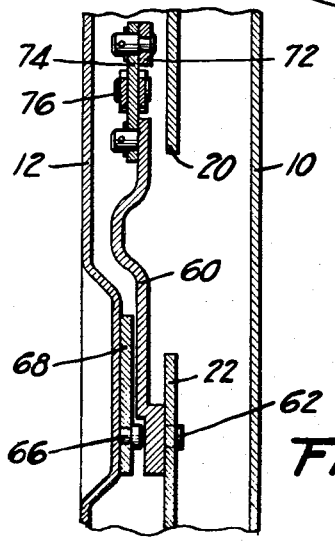
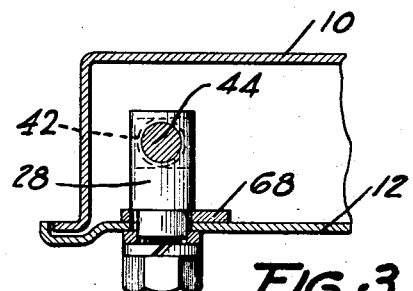

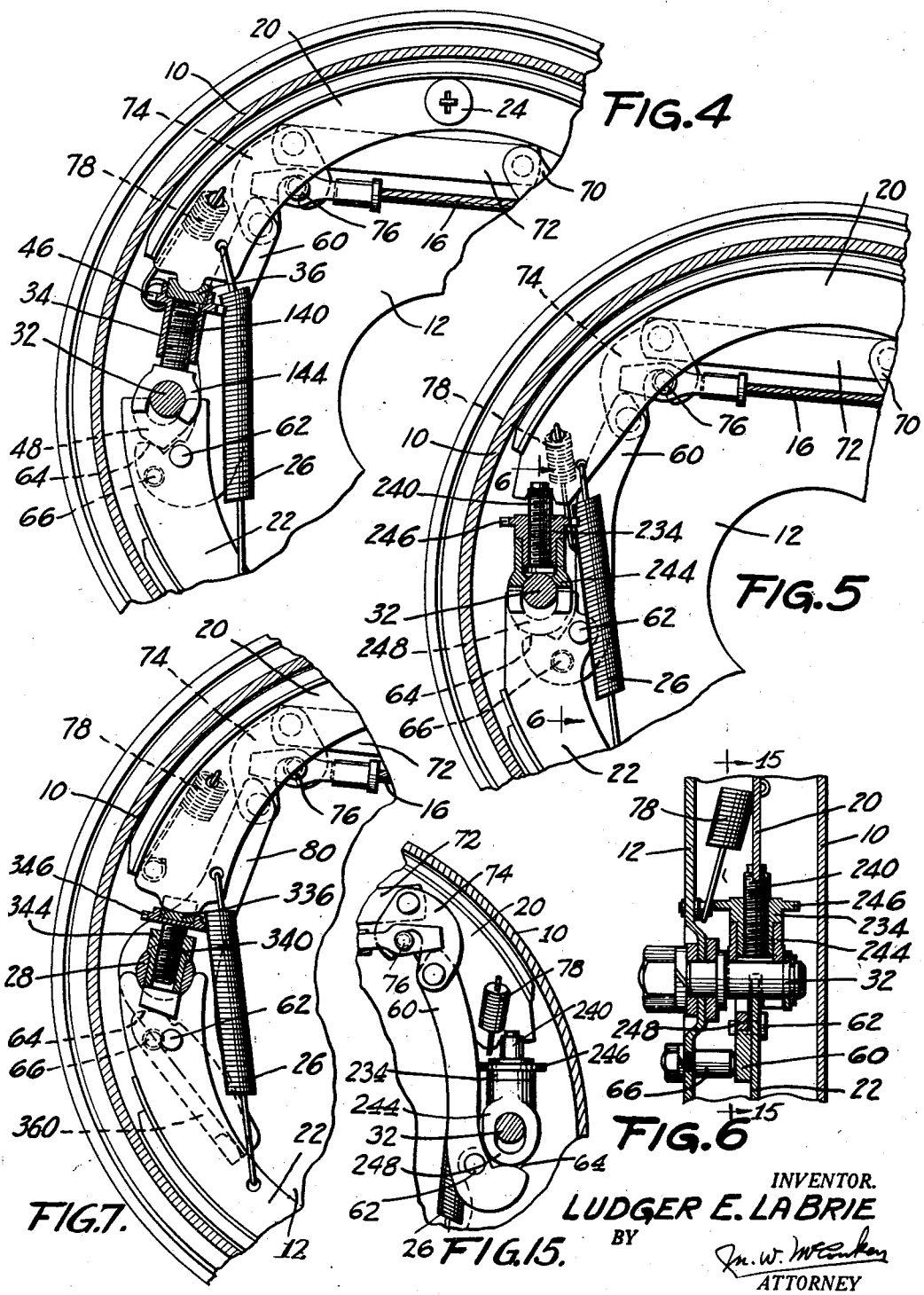

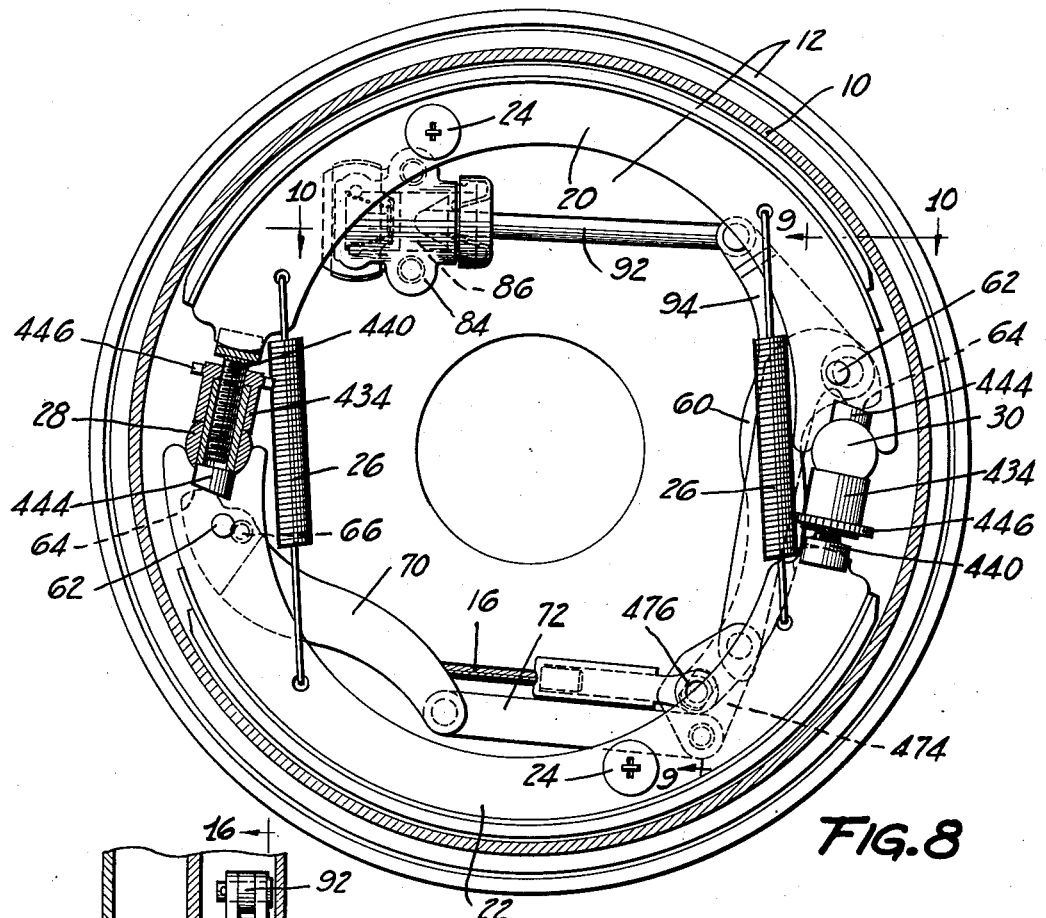
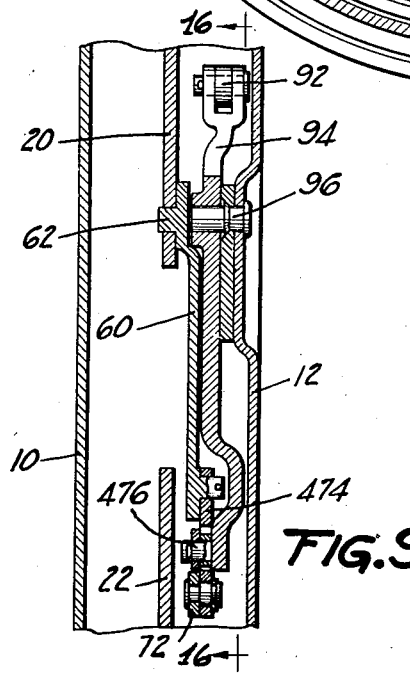
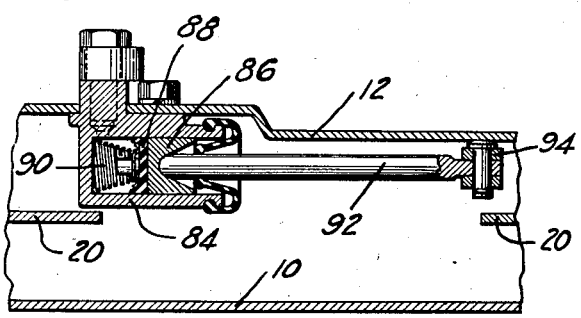

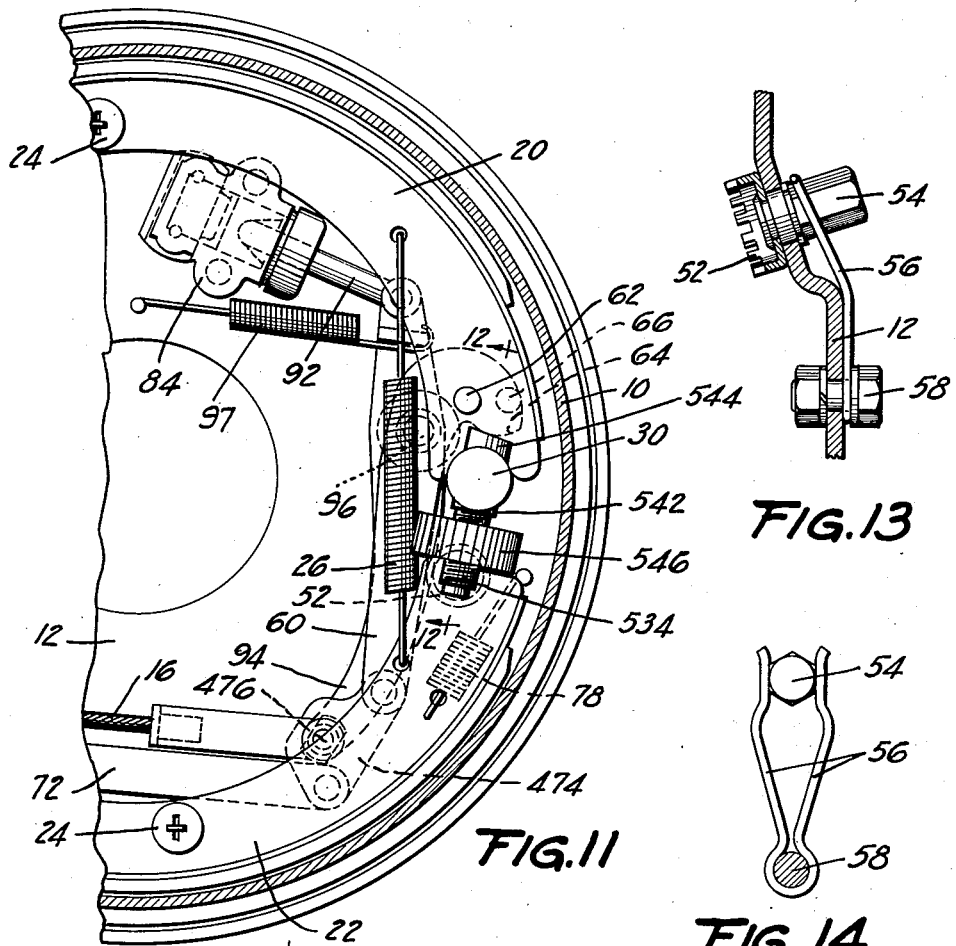

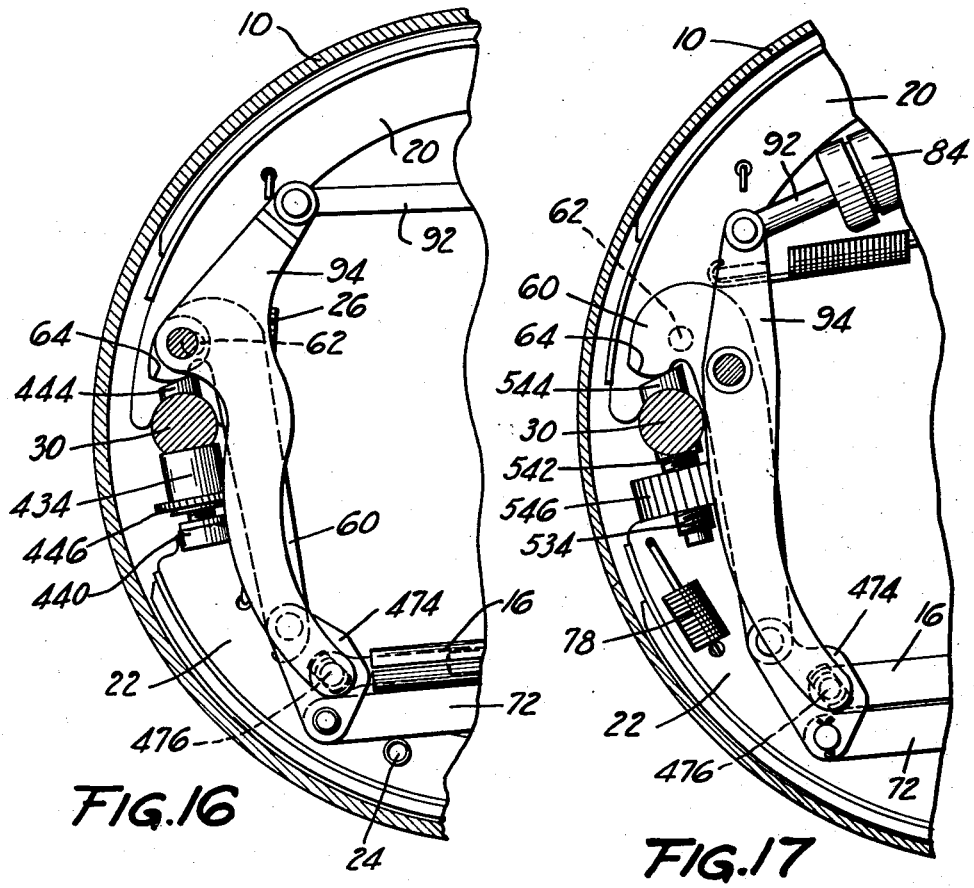

2,087,381

UNITED STATES PATENT OFFICE 2,087,381

BRAKE

Ludger E. La Brie, South Bend, Ind., assignor to Bendix Products Corporation, South Bend, Ind., a corporation of Indiana Application February 11, 1935, Serial No. 5,906

12 Claims. (Cl. 188—78)

This invention relates to brakes, and is illustrated as embodied in an internal expanding automobile brake of the type having a pair of brake shoes which are individually shiftable to anchor at opposite ends in forward and reverse braking, to give maximum effectiveness without compounding the action of the one shoe on the other.

An object of the invention is to provide a simple operating mechanism for such a brake arranged to have its action equalized on the shoes in both forward and reverse braking, and which is preferably adapted for use with a control of the "cable-and-conduit" or equivalent type in which there is a tension element extending horizontally into the brake.

In one desirable arrangement, the brake operating means includes levers adjacent the front and rear brake anchorages respectively and extending into the upper part of the brake chamber. The rear lever has connected thereto at its upper end the rear end of a horizontal thrust link which extends to a position above the end of the front operating lever. An equalizing bar, or equivalent equalizing means, is connected to the thrust link and to the front brake lever, and is centrally connected to the end of the flexible tension element of the cable-and-conduit type brake control.

The above and other objects and features of the invention, including various novel combinations of parts and desirable particular constructions, will be apparent from the following description of the illustrative embodiments shown in the accompanying drawings, in which:

Figure 1 is a vertical section through a front brake in one embodiment, just inside the head of the brake drum, showing the brake shoes in side elevation;

Figure 2 is a partial section, on the line 2—2 of Figure 1, showing the front brake operating lever;

Figure 3 is a partial section on the line 3—3 of Figure 1, showing the front anchorage;

Figure 4 is a partial section through a second embodiment, and corresponding to the upper left-hand portion of Figure 1;

Figure 5 is a partial section corresponding to Figure 4, but showing another embodiment;

Figure 6 is a partial section on the line 6—6 of Figure 5 showing the front operating lever;

Figure 7 is a partial section corresponding to Figures 4 and 5, but showing another modification;

Figure 8 is a section corresponding to Figure 1 except that it is a rear brake, but showing another modification having both hydraulic and mechanical operating means;

Figure 9 is a partial section on the line 9—9 of Figure 8 and showing the front brake-operating lever;

Figure 10 is a partial section on the line 10—10 of Figure 8, showing the hydraulic operating means;

Figure 11 is a partial section corresponding to the right-hand portion of Figure 8, but showing another modification;

Figure 12 is a partial section on the line 12—12 of Figure 11, through the anchorage;

Figure 13 is a partial section through the adjusting means of Figure 11, showing the addition of a yielding lock for the adjusting means;

Figure 14 is a partial section on the line 14—14 of Figure 13, showing the yielding locking means;

Figure 15 is a partial section on the line 15—15 of Figure 6, similar to Figure 5 but viewed from the opposite side, thus showing the levers in full lines;

Figure 16 is a partial section on the line 16—16 of Figure 9, similar to the right hand portion of Figure 8, but viewed from the opposite side, thus showing the levers in full lines; and Figure 17 is a partial section on the line 17—17 of Figure 12, similar to Figure 11, but viewed from the opposite side, thus showing the levers in full lines.

The illustrated brakes are of the inclosed internal expanding type, each comprising a rotatable drum 10 and a stationary backing plate 12 jointly forming a substantially closed brake chamber which houses the movable parts. Some features of the invention are especially applicable to a brake having a cable-and-conduit type control comprising a flexible horizontal Bowden-type conduit 14 supported at one end on the backing plate and at the other end on the chassis frame, and forming in effect a flexible extension of the brake chamber. This conduit houses a tension element such as a cable 16 which extends into the brake chamber.

Both front and rear brakes are illustrated in various constructions. The front and rear brakes of the same system are substantially the same except that they are turned around with respect to each other, so that the tension element 16 enters from the rear of a front brake and from the front of a rear brake.

The brakes illustrated in the drawings are all of the type having upper and lower brake shoes 20 and 22, which are individually shiftable to anchor at opposite ends in forward and reverse braking. The shoes have suitable steady rests 24, and are shown connected by return springs 26.

The brakes have front and rear anchorages, shown as anchor posts 28 and 30 having openings therethrough in some of the embodiments, and as solid anchor posts 32 in others. In both cases the anchor posts are preferably carried by the backing plate 12, as shown for example in Figure 3.

In the brake of Figures 1 and 2, each of the shoes has at its "toe" end (i. e. the end which leaves its anchor in forward braking) an adjustable thrust device comprising a threaded socket 34 having its head recessed rotatably to receive a member 36 formed with a notch embracing the end of the web of the shoe.

The socket 34 has adjustably threaded therein a part 40 having a thrust flange 42 engageable with the flattened side of the anchor 28 or 30, and beyond which is a cylindrical portion 44 which is slotted to embrace the end of the web of the shoe on the other side of the anchor. The socket 34 is shown provided with a toothed flange 46 which can be turned to adjust the brake for wear, and which is yieldingly held locked by the adjacent return spring 26.

In Figure 4, the construction is the same except that part 140 is formed with a yoke 144 encircling the solid anchor 32, and slotted beyond the anchor to embrace the end of the opposite shoe. One side of the slotted part of the yoke, shown at 48 in dotted lines, is carried around integrally of the arms of the yoke, to form a thrust surface engageable with an operating lever hereinafter described.

In Figures 5, 6 and 15, a threaded stem 240 is notched at its end for seating engagement with the end of the shoe web, and has threaded thereon an adjustment nut 234 rotatably seated in a yoke 244 arranged like the yoke 144 described above, and having a similar thrust end part 248.

In Figure 7, a threaded stem 340 has a head or flange 346 formed with a recess for a member 336 notched to embrace the end of the shoe web. A thrust socket 344 has a shoulder for anchoring engagement with the flattened side of the anchor post 28, and extends through the anchor and is slotted at its end to embrace the end of the web of the opposite shoe.

In Figure 8, a threaded stem 440 is slotted at one end to embrace the end of the shoe web, and has adjustably threaded thereon an adjustment nut 434 having a relatively large socket rotatably mounted on a smaller socket 444 extending through the anchor 28 and slotted at its lower end to embrace the end of the web of the lower shoe. The nut 434 has direct anchoring engagement with the flattened side of the post 28.

Figures 11 and 12 show a threaded stem 534 slotted to embrace the end of the web of shoe 22, and receiving an adjustment nut 546 in thrust engagement with the end of shoe 22. Stem 534 has a flange 542 for anchoring engagement with the anchor post 30, and beyond that has a part in thrust engagement with the end of a thrust member 544 which is slotted to embrace the end of the web of shoe 20. Parts 534 and 544 are further connected by forming one of them with a pilot 50 extending into a socket in the other.

The teeth of nut 546 are shown relatively long, and as being operatively engaged by the teeth of a crown gear 52 carried by a stem 54 extending through the backing plate and yieldingly locked by the two arms of a spring 56 shown secured to the backing plate by means such as a bolt 58. This permits adjustment from outside the brake.

An important feature of the present invention relates to the construction and arrangement of the operating mechanism and particularly to providing a simple operating mechanism having an equalized (i. e. balanced) action on the two shoes in both forward and reverse braking.

In Figures 1 and 2, showing a front brake, a vertical front lever 60 adjacent the anchor 28 is connected to the end of shoe 22 by means such as a pivot 62, and has a thrust end or cam 64 engaging the end of part 44, through which it acts on shoe 20. This part of the lever is guided by the rounded end of a pin 66 on a plate 68 held by anchor 28. The lever 60 extends past the anchor 28 into the upper part of the brake chamber, between the backing plate 12 and the web of the shoe 20.

The shoe 20 is provided with a generally similar lever 70, which differs from lever 60 mainly in being somewhat inclined forwardly, so that it approaches a vertical position as the brake is applied. The upper end of the lever 70 is pivoted to the rear end of a horizontal thrust link 72, which extends forwardly to a position generally in line with the upper end of the lever 60.

The lever 60 and the link 72 are operatively connected to the tension element 16 by equalizing (i. e. balancing) means shown as a vertical equalizer bar 74 pivoted at its upper and lower ends to the link 72 and the lever 60 respectively and shown centrally formed with a hook detachably and pivotally engaging a transverse pin 76 carried by the end of the tension element 16.

It will be seen that, by taking into account the lengths and inclinations of levers 60 and 70 and of bar 74, and the position of pin 76 along the length of bar 74, any desired distribution of forces can be secured. Ordinarily I prefer to apply the same pressures to both shoes.

Unbalancing springs 78 are preferably provided to hold the heel ends of the shoes yieldingly against their anchors.

The operating mechanism shown in Figures 4 to 6 and 15 is the same as described above, except that the cam surfaces 64 of the operating levers 60 bear on the closed ends 48 of the yokes 32 surrounding the anchor instead of on the ends of members 44 projecting through the anchors. It will be noted that the location of the pivot 62 is slightly altered and that the thrust between members 248 and 64 is more nearly perpendicular in Figure 5 than in Figures 1 and 4. The preferred form is that of Figures 1 and 4 in which the angular thrust tends to overcome the pull to the right exerted on the shoe 22 by the cable through the lever 60 and the pivot 62.

The arrangement of Figure 7 differs from that described above in that the lever 360, corresponding to lever 60, is inclined downwardly, and has an integral lug on one side engaged by the lower end of a lever 80 pivoted on the anchor 28 and connected at its upper end to the equalizer 74.

The brake of Figures 8 to 10 and 16 is a rear brake, and is therefore turned around as compared to the front brake of Figure 1. It also differs from this brake in having a hydraulic actuator (used for service, leaving the tension element to be connected to the usual hand lever for parking). The illustrated hydraulic actuator comprises a single-ended wheel cylinder 84 carried by the backing plate 12, and containing a piston 86 shown with a rubber cup packing 88 held by a spring 90.

The piston 86 is recessed for pivotal thrust engagement with the end of a piston rod 92 pivoted to the upper end of a vertical lever 94 fulcrumed on the pin 96 carried by the backing plate. At its lower end, the lever 94 is shown provided with a pin 476 which connects both it and the tension element 16 to the center of the equalizer 474, so that they may be used alternatively but both with an equalized action. To permit free motion of the equalizer bar, pin 476 engages it through a bushing having flattened sides and slidable in an elongated slot in the central portion of the equalizer.

The control and operating mechanism of Figures 11 to 14 and 17 is the same as that in Figures 8 to 10, except for minor differences in the size and angle of arrangement of some of the parts. The main differences are: the hydraulic cylinder 84 is closer to the lever 94 and consequently the piston rod 92 is shortened, the pivot 96 has been moved closer to the center of the brake and a return spring 97 is attached to the backing plate and the lever 94 to return the lever to its inoperative position.

All the illustrations show a brake in which the normal forward motion is counterclockwise. Tensioning cables 14 exert preferably equal forces through the equalizers and connecting links upon the levers 60 and 70 causing them to move in a clockwise direction and react upon the corresponding thrust parts to move the shoes apart. Due to the presence of the unbalancing springs 78, the heels or trailing ends of the shoes remain on the anchors and the toe or leading ends move into engagement with the drums whereupon each shoe acts as a self-actuating shoe assisted by continued tension on the cable. Release of the tension on the cable permits the return springs 26 to withdraw the shoes from the drum to their inoperative positions.

When the car is in reverse the leading ends become the trailing ends. The same action takes place upon tensioning the cable i. e. the same ends (now the trailing ends) leave the anchors and engage the shoe first, whereupon both shoes, actuated by friction with the drum, shift in the direction of rotation against the tension of the unbalancing springs until the now trailing ends reengage the anchors and the opposite ends come in contact with the drum whereupon the shoes become self-actuating in the opposite direction. Thus it will be seen that each shoe is equally effective whether the car is operated in the forward or reverse directions.

In the forms illustrated having alternative actuating means the action of the brakes is the same whether actuated hydraulically or mechanically. If the brake is hydraulically actuated, the cable 16 flexes and does not interfere with the motion of the applying levers. When mechanical actuation is used, the piston rod 92 withdraws freely from its recess in the piston.

While several illustrative embodiments have been described in detail, it is not my intention to limit the scope of the invention to those particular embodiments, or otherwise than by the terms of the appended claims.

I claim:

1. A brake comprising, in combination with a drum and a backing plate forming a substantially closed brake chamber and with a horizontal flexible conduit forming an extension of said housing and constituting a part of a control for the brake and with a horizontal flexible tension element extending through said conduit and through the backing plate into said brake chamber, front and rear anchorages carried by the backing plate inside the brake chamber, upper and lower brake shoes each anchoring on one anchorage when the drum is turning in one direction and on the other anchorage when the drum is turning in the other direction, operating levers arranged adjacent said anchorages respectively and having their ends on the same side of said chamber, a thrust link connected to the end of one of said levers and extending horizontally to a position in line with the end of the other lever, and an equalizer centrally connected to said tension element and at its ends to the end of said link and to the said end of the other lever respectively.

2. A brake comprising, in combination with a drum and a backing plate forming a substantially closed brake chamber and with a horizontal flexible conduit forming an extension of said housing and constituting a part of a control for the brake and with a horizontal flexible tension element extending through said conduit and through the backing plate into said brake chamber, front and rear anchorages carried by the backing plate inside the brake chamber, upper and lower brake shoes each anchoring on one anchorage when the drum is turning in one direction and on the other anchorage when the drum is turning in the other direction, operating levers arranged adjacent said anchorages respectively and having their ends on the same side of said chamber, a thrust link connected to the end of one of said levers and extending horizontally to a position in line with the end of the other lever, and equalizer means connecting said tension element to said link and to said other lever.

3. A brake having a control comprising a horizontal flexible tension element extending into said brake, front and rear anchorages, upper and lower brake shoes each anchoring on one anchorage in forward braking and on the other anchorage in reverse braking, operating levers arranged adjacent said anchorages respectively, a thrust link connected to the end of one of said levers and extending to a position adjacent the other lever, and an equalizer centrally connected to said tension element and at its ends to the end of said link and to the said other lever respectively.

4. A brake having a control comprising a horizontal flexible tension element extending into said brake, front and rear anchorages, upper and lower brake shoes each anchoring on one anchorage in forward braking and on the other anchorage in reverse braking, operating levers arranged adjacent said anchorages respectively, a thrust link connected to the end of one of said levers and extending to a position adjacent the other lever, and equalizer means connecting said tension element to said link and to said other lever.

5. A brake having a control comprising a horizontal flexible tension element extending into said brake, front and rear anchorages, upper and lower brake shoes each anchoring on one anchorage in forward braking and on the other anchorage in reverse braking, operating levers arranged adjacent said anchorages respectively, a thrust link connected to the end of one of said levers and extending to a position adjacent the other lever and an equalizer bar formed centrally with a hook detachably connected to the end of said tension element and connected at one end to said link and at its other end to said other lever.

6. A brake having shoes individually shiftable to anchor at their opposite ends in forward and reverse braking, two applying devices at the ends of the shoes on opposite sides of the brake, a link pivotally connected to one of said devices and extending across said brake to a point adjacent the other, equalizing means pivotally connected at opposite ends to said link and said other applying device and two alternatively-operable applying means both acting on said equalizing means.

7. A brake having shoes individually shiftable to anchor at their opposite ends in forward and reverse braking, two applying devices at the ends of the shoes on opposite sides of the brake, a link pivotally connected to one of said devices and extending across said brake to a point adjacent the other, equalizing means pivotally connected at opposite ends to said link and said other applying device, and two alternatively-operable applying means both acting on said equalizing means, and one of which is fluid-operated and the other of which is mechanical.

8. A brake having shoes individually shiftable to anchor at their opposite ends in forward and reverse braking, two applying devices at the ends of the shoes on opposite sides of the brake, a link pivotally connected to one of said devices and extending across said brake to a point adjacent the other, equalizing means pivotally connected at opposite ends to said link and said other applying device, and two alternatively-operable applying means both acting on said equalizing means, one of which is directly connected to said equalizing means and the other of which is across the brake from said means and is connected thereto by a member swinging in a vertical plane.

9. A brake having shoes individually shiftable to anchor at their opposite ends in forward and reverse braking, two applying devices at the ends of the shoes on opposite sides of the brake, a link pivotally connected to one of said devices and extending across said brake to a point adjacent the other, equalizing means pivotally connected at opposite ends to said link and said other applying device, and two alternatively-operable applying means both acting on said equalizing means, one of which is directly connected to said equalizing means and the other of which is across the brake from said means and is connected thereto by a member swinging in a vertical plane, and one of which is fluid-operated and the other of which is mechanical.

10. A brake having shoes individually shiftable to anchor at their opposite ends in forward and reverse braking, two applying devices at the ends of the shoes on opposite sides of the brake, a link pivotally connected to one of said devices and extending across said brake to a point adjacent the other, equalizing means pivotally connected at opposite ends to said link and said other applying device and hydraulic and mechanical applying means both acting on said equalizing means.

11. A brake having shoes individually shiftable to anchor at their opposite ends in forward and reverse braking, two applying devices at the ends of the shoes on opposite sides of the brake, equalizing means acting on said devices said means comprising a stamping having pivotal connections at its ends engaging said devices and provided centrally with a hook, and applying means detachably engaging said hook.

12. A brake having shoes individually shiftable to anchor at their opposite ends in forward and reverse braking, two applying devices at the ends of the shoes on opposite sides of the brake, a link pivotally connected to one of said devices and extending to a point adjacent the other, an equalizer pivotally connected at opposite ends to the link and to the other applying device, said equalizer comprising a stamping cut-out adjacent its central portion to form a hook, and an applying device detachably engaging the hook.

LUDGER E. LA BRIE.